(12) United States Patent
Murata (10) Patent No.: US 9,403,339 B2
(45) Date of Patent: Aug. 2, 2016

(54) HONEYCOMB STRUCTURAL BODY

(71) Applicant: DENSO CORPORATION, Kariya, Aichi-pref (JP)

(72) Inventor: Masakazu Murata, Obu (JP)

(73) Assignee: DENSO CORPORATION, Kariya (JP)

( * ) Notice: Subject to any disclaimer, the term of this patent is extended or adjusted under 35 U.S.C. 154(b) by 323 days.

(21) Appl. No.: 14/221,905

(22) Filed: Mar. 21, 2014

(65) Prior Publication Data

US 2014/0287192 A1    Sep. 25, 2014

(30) Foreign Application Priority Data

Mar. 22, 2013    (JP) .................... 2013-059651

(51) Int. Cl.
| | | |
|---|---|---|
| *F01N 3/022* | (2006.01) | |
| *B01D 46/24* | (2006.01) | |
| *B32B 3/12* | (2006.01) | |
| *F01N 3/28* | (2006.01) | |

(52) U.S. Cl.
CPC ............... *B32B 3/12* (2013.01); *B01D 46/247* (2013.01); *F01N 3/2828* (2013.01); *B01D 2046/2496* (2013.01); *F01N 2330/06* (2013.01); *F01N 2330/30* (2013.01); *F01N 2330/60* (2013.01); *Y10T 428/24157* (2015.01)

(58) Field of Classification Search
None
See application file for complete search history.

(56) References Cited

U.S. PATENT DOCUMENTS

| | | | | |
|---|---|---|---|---|
| 4,810,554 A | * | 3/1989 | Hattori .................. | F01N 3/2828 428/116 |
| 5,108,685 A | * | 4/1992 | Kragle .................. | F01N 3/2828 428/116 |
| 5,514,446 A | | 5/1996 | Machida et al. | |
| 5,916,133 A | | 6/1999 | Burhmaster et al. | |
| 5,952,079 A | * | 9/1999 | Andou ................ | C04B 38/0006 428/116 |
| 6,248,421 B1 | * | 6/2001 | Koike .................... | F01N 3/2828 428/116 |
| 9,073,289 B2 | * | 7/2015 | Tamai .................. | B01D 46/247 |
| 2002/0042344 A1 | | 4/2002 | Kondo et al. | |
| 2005/0107244 A1 | * | 5/2005 | Ichikawa ............. | B01D 46/247 428/116 |
| 2015/0005153 A1 | * | 1/2015 | Hayashi ................... | F01N 3/28 502/87 |
| 2015/0047307 A1 | * | 2/2015 | Hayashi ............. | B01D 46/2425 55/523 |
| 2015/0275726 A1 | * | 10/2015 | Tamai ................ | B01D 46/2474 428/116 |

FOREIGN PATENT DOCUMENTS

| | | |
|---|---|---|
| JP | 62-187628 | 11/1987 |
| JP | 07-246341 | 9/1995 |
| JP | 10-192635 | 7/1998 |

(Continued)

*Primary Examiner* — David Sample
*Assistant Examiner* — Nicholas W Jordan
(74) *Attorney, Agent, or Firm* — Nixon & Vanderhye P.C.

(57) ABSTRACT

A honeycomb structural body has cells surrounded by cell walls arranged in a lattice-like shape. A cross section is divided into a central section and an outer peripheral section. The outer peripheral section surrounds the central section through a boundary partition wall. The outer peripheral section is lower in a cell density than the central section. The cells contain imperfectly shaped cells in contact directly with the boundary partition wall. In the imperfectly shaped cells, first specific imperfectly shaped cells are smaller in opening area than second specific imperfectly shaped cells. Each first specific imperfectly shaped cells has an opening area of not more than a predetermined area $S=(P-T)^2/8$. P and T indicate a cell pitch and a thickness of each cell wall, respectively. The opening section of the first specific imperfectly shaped cells is closed by the same raw material of the cell walls.

6 Claims, 7 Drawing Sheets

(56) References Cited

FOREIGN PATENT DOCUMENTS

| JP | 2002-177794 | 6/2002 |
| JP | 2008-018370 | 1/2008 |
| JP | 2008-200605 | 9/2008 |
| JP | 2013-154278 | 8/2013 |
| JP | 2013-173133 | 9/2013 |
| JP | 2013-173134 | 9/2013 |

* cited by examiner

3 NORMAL CELL (PERFECTLY SHAPED CELL)

FIG.7B

32 IMPERFECTLY SHAPED CELL

FIG.7C

32 IMPERFECTLY SHAPED CELL

FIG.8

HONEYCOMB STRUCTURAL BODY

CROSS-REFERENCE TO RELATED APPLICATION

This application is related to and claims priority from Japanese Patent Application No. 2013-59651 filed on Mar. 22, 2013, the contents of which are hereby incorporated by reference.

BACKGROUND OF THE INVENTION

1. Field of the Invention

The present invention relates to honeycomb structural bodies for supporting catalyst capable of purifying exhaust gas emitted from an internal combustion engine mounted to motor vehicles, etc.

2. Description of the Related Art

Various types of honeycomb structural bodies have been known and used, which support catalyst. The catalyst is in general capable of purifying exhaust gas emitted from an internal combustion engine mounted to a motor vehicle, etc. For example, patent document 1, Japanese patent laid open publication No. 2008-18370, and patent document 2, Japanese patent laid open publication No. H07-246341, have disclosed a honeycomb structural body having a plurality of cells. Each of the cells is surrounded by cell walls. The cell walls are arranged in a lattice-like shape in a cross section along a longitudinal direction of the honeycomb structural body. That is, the cell walls form the cells arranged in a lattice-like shape. Each of the cells has a square shape or a hexagonal shape, for example.

Such a honeycomb structural body is mounted to the inside of an exhaust gas pipe connected to an internal combustion engine. The exhaust gas having a high temperature emitted from the internal combustion engine flows in the exhaust gas pipe. A catalyst reaction between the exhaust gas and the catalyst supported by the honeycomb structural body is generated in the inside of the exhaust gas pipe when the exhaust gas is passing through the inside of the honeycomb structural body mounted to the exhaust gas pipe. The exhaust gas is purified by the catalyst reaction in the honeycomb structural body, and the purified exhaust gas is discharged to the outside of the exhaust gas pipe.

Recently, because the vehicle emissions control of reducing motor vehicle emissions, etc. is becoming stricter year by year in view of environmental protection, there is a strong demand to decrease carbon monoxide contained in exhaust gas emitted from an internal combustion engine and more improve a fuel efficiency of motor vehicles. The above recent demand increases an amount of noble metal which is used as catalyst in the honeycomb structural body. From the viewpoint of increasing the catalyst cost and difficulty in procurement of resources such as noble metal, there is a strong demand of decreasing the amount of noble metal used in the honeycomb structural body. Still further, there is also a strong demand for the honeycomb structural body to have an excellent capability of purifying exhaust gas emitted from the internal combustion engine.

For example, the patent document 1 shows a honeycomb structure body having a structure in which a boundary partition wall divides a cell formation section into a central section and an outer peripheral section in a cross section along a direction which is perpendicular to a longitudinal direction of the honeycomb structure body. The outer peripheral section has an opening area ratio which is larger than an opening area ratio of the central section. The opening area ratio indicates a ratio of a whole area of opening sections to a whole area of cell walls in a section (such as the central section and the outer peripheral section) on a cross section which is perpendicular to a longitudinal direction of a honeycomb structure body. This structure makes it possible for exhaust gas to easily flow in the outer peripheral section when compared with in the central section because the outer peripheral section has a large opening area ratio when compared with the opening area ratio of the central section although the outer peripheral section is lower in a gas flowing rate than the central section. This also makes it possible to improve the exhaust gas purification performance of the honeycomb structure body.

However, the honeycomb structure body disclosed in the patent document 1 has imperfectly shaped cells in addition to normal cells (or perfectly shaped cells). The normal cell has a perfect shape surrounded by the cell walls only. On the other hand, one or more sides of the imperfectly shaped cells are surrounded by the boundary partition wall, i.e. each of the imperfectly shaped cells is in contact directly with the boundary partition wall. If the honeycomb structure body is produced by using an extrusion die, there is a possibility of deforming and breaking the cell walls and the boundary partition wall which is in contact directly with the imperfectly shaped cells. Further, there is a possibility that the cell walls near the imperfectly shaped cells are affected by the deformation of the cell walls and the boundary partition wall.

In addition, a catalyst application process is performed after the production of the honeycomb structure body. In the catalyst application process, a catalyst slurry containing catalyst such as noble metal is fed to the inside of the honeycomb structure body in order to apply catalyst on the inner walls of the cells. At this time, when an imperfectly shaped cell having a small-sized opening area is present in the honeycomb structure body, the imperfectly shaped cell is clogged by the catalyst during the catalyst application process. This decreases the gas flowing rate and increases a pressure loss of the honeycomb structure body. Still further, because the catalyst such as noble metal is supported on the catalyst clogged cells where exhaust gas does not flow easily, an amount of wasted catalyst increases.

In order to solve the problem previously described, there is the technique disclosed in the patent document 2 in which the overall imperfectly shaped cells, which are in contact directly with the boundary partition wall, are plugged or closed by the same material with which the cell walls are formed.

Figure 8:
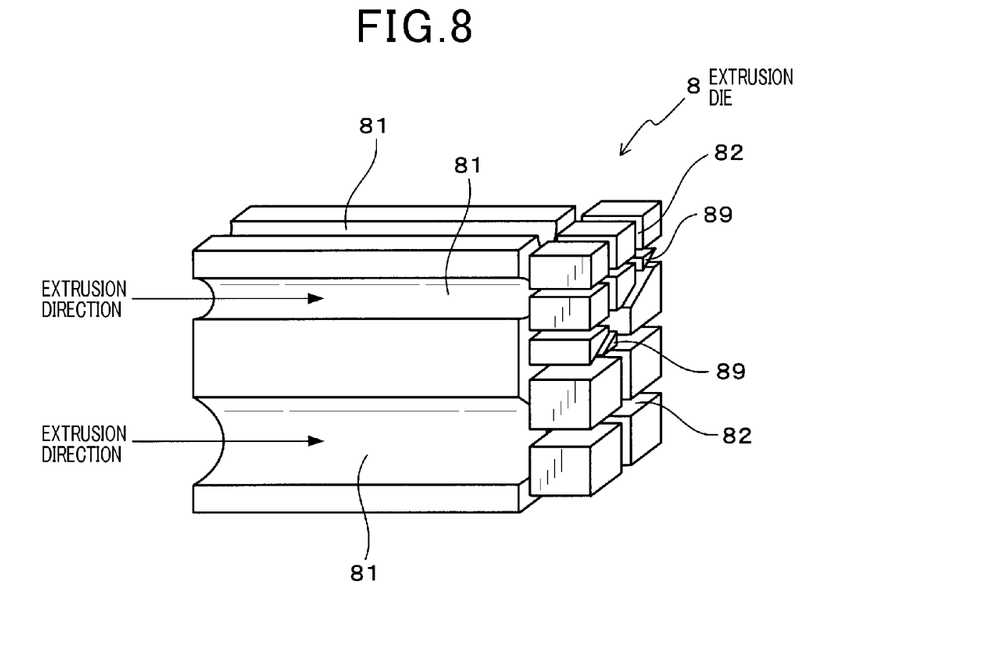
FIG. 8 is a schematic view showing a part of an extrusion metal die to be used when a honeycomb structural body is manufactured.

FIG. 8 is a schematic view showing a part of an extrusion metal die 8 to be used when a honeycomb structural body is produced. That is, FIG. 8 is a view showing a schematic structure of the extrusion metal die 8. In FIG. 8, a feeding direction is designated by the arrows. FIG. 8 shows a part of the extrusion metal die 8 comprised of feeding holes 81 and slit grooves 82. Raw material is fed through the feeding holes 81. The feeding holes 18 are communicated with the slit grooves 82. The cell walls and the boundary partition wall are formed by the slit grooves 82. Blocks 89 are removed from the extrusion metal die 8 in order to form a honeycomb structural body in which the overall imperfectly shaped cells are plugged or closed.

By the way, when the extrusion metal die 8 has a structure in which the overall imperfectly shaped cells are plugged or closed, and uses the extrusion metal die 8 during the process of producing the honeycomb structure body, a difference in feeding speed and feeding amount of raw material is generated between the parts corresponding to the cell walls forming the normal cells (or the perfectly shaped cells) and the parts corresponding to the cell walls forming the imperfectly shaped cells. That is, because a feeding resistance of raw material in the parts in the extrusion metal die (which form the imperfectly shaped cells to be plugged) is decreased, this increases a feeding speed and an amount of raw material at these parts in the extrusion metal die (which correspond to the imperfectly shaped cells). Further, this generates shape deformation and defects of the cell walls which are adjacent to the imperfectly shaped cells because the raw material is provided to the imperfectly shaped cells caused by the increased feeding speed and amount thereof. As a result, there is a possibility of decreasing the whole strength of the produced honeycomb structural body. Furthermore, when the opening section of all of the imperfectly shaped cells in the produced honeycomb structural body are completely plugged or closed, a pressure loss of the produced honeycomb structural body is increased and a specific surface area of the cell walls in the honeycomb structural body is decreased. As a result, there is a possibility of decreasing a fuel efficiency of an internal combustion engine, an output performance of the internal combustion engine, deteriorating a performance of purifying exhaust gas by the decreased specific surface area of the cell walls, where the specific surface area is necessary to perform a correct catalyst reaction between exhaust gas and catalyst.

SUMMARY

It is therefore desired to provide a honeycomb structural body having an excellent strength and decreased number of cells having shape deformation and defects.

An exemplary embodiment provides a honeycomb structural body comprised of cell walls and a plurality of cells. The cell walls are arranged in a lattice-like shape. The cells are formed by the cell walls so that each of the cells is surrounded by the cell walls. A cross-sectional area of the honeycomb structural body in a direction, which is perpendicular to an axial direction of the honeycomb structural body, is divided into a central section and an outer peripheral section by a boundary partition wall. The central section includes a central axis of the honeycomb structural body and is arranged in an inside of the boundary partition wall. The outer peripheral section is arranged at an outside of the central section through the boundary partition wall so that the outer peripheral section surrounds the central section. The outer peripheral section has a cell density which is lower than a cell density of the central section. The cells in the central section and the outer peripheral section contain imperfectly shaped cells which are in contact directly with the boundary partition wall. The imperfectly shaped cells, formed in the central section and the outer peripheral section, are facing to each other through the boundary partition wall. The imperfectly shaped cells formed in the central section and the outer peripheral section are divided into a first imperfectly shaped cell group and a second imperfectly shaped cell group. Each of the imperfectly shaped cells in the first imperfectly shaped cell group is smaller in an opening area of an opening section than each of the imperfectly shaped cells in the second imperfectly shaped cell group. The first imperfectly shaped cell group comprising first specific imperfectly shaped cells. An opening area of the opening section of each of the first specific imperfectly shaped cells is not more than a predetermined area S. The first specific imperfectly shaped cells are plugged or closed by a same raw material with which the cell walls are formed. The predetermined area S is expressed by an equation of $S=(P-T)^2/8$. Reference character P in the equation indicates a cell pitch of the cells arranged in the central section and the outer peripheral section. Reference character T in the equation indicates a thickness of the cell walls.

In the honeycomb structural body having the structure previously described, the cells in each of the central section and the outer peripheral section contain the imperfectly shaped cells. The imperfectly shaped cells are in contact directly with the boundary partition wall. The imperfectly shaped cells formed in the central section and the imperfectly shaped cells formed in the outer peripheral section are facing to each other through the boundary partition wall.

The imperfectly shaped cells in the central section and the outer peripheral section are divided into a first imperfectly shaped cell group and a second imperfectly shaped cell group. Each of the imperfectly shaped cells in the first imperfectly shaped cell group is smaller in an opening area of an opening section than each of the imperfectly shaped cells in the second imperfectly shaped cell group. First specific imperfectly shaped cells in the first imperfectly shaped cell group are plugged or closed by the same raw material with which the cell walls are formed. An opening area of the opening section of each of the first specific imperfectly shaped cells is not more than the predetermined area S. The predetermined area S is expressed by the equation of $S=(P-T)^2/8$. In the equation, reference character P indicates a cell pitch of the cells arranged in the central section and the outer peripheral section. Reference character T indicates a thickness of the cell walls.

That is, the first specific detective cells in the first imperfectly shaped cell group, which are in contact directly with the boundary partition wall, are plugged or closed by the same raw material with which the cell walls are formed. The opening section of each of the first specific imperfectly shaped cells has an opening area of not more than the predetermined area S. The first specific imperfectly shaped cell is smaller in an opening area of the opening section than the second specific imperfectly shaped cell. The second imperfectly shaped cell group and the second specific imperfectly shaped cells will be explained later in detail.

In a catalyst application process, a catalyst slurry containing catalyst such as noble metal is fed to the inside of the honeycomb structure body in order to apply and support catalyst on the surfaces of the cell walls. Because the opening section of each of the first specific imperfectly shaped cells in the honeycomb structural body has a small opening area, the opening section of each of the first specific imperfectly shaped cells is often clogged with the catalyst in the catalyst slurry which is fed during the catalyst application process. As a result, the opening area of the opening section of each of the first specific imperfectly shaped cells is further decreased by the catalyst, and this makes a difficulty to smoothly flow exhaust gas through the first specific imperfectly shaped cells when the honeycomb structural body is mounted to an exhaust gas pipe of an internal combustion engine.

Accordingly, the opening section of each of the first specific imperfectly shaped cells in the honeycomb structural body is plugged or closed with the same raw material of the cell walls in the production process of the honeycomb structural body. In other words, when the parts in the extrusion metal die, which correspond to the first specific imperfectly shaped cells of the honeycomb structural body, are open, the first specific imperfectly shaped cells of the honeycomb structural body are plugged or closed with the raw material. This makes it possible to suppress the generation of a difference in feeding speed and feeding amount of raw material between the normal cells (or the perfectly shaped cells) and the first specific imperfectly shaped cells when the raw material is passing through the extrusion metal die in the manufacturing process.

It is necessary to supply an excessive amount of the raw material to the imperfectly shaped cells when the opening area of the imperfectly shaped cells is plugged or closed. The more the excessive amount of the raw material to be used by closing the opening section of the imperfectly shaped cells increases, the more the shape deformation and defects such as cell-wall deformation and unnecessarily thin cell wall increase because the excessive amount of the raw material is not fed to the normal cells (or the perfectly shaped cells) adjacent to the imperfectly shaped cells. In order to avoid this drawback, the subject matter of the present invention selects the size of the opening section (or its opening area) of the imperfectly shaped cells to be plugged or closed. This makes it possible to prevent the generation of shape deformation and defects such as cell-wall deformation and unnecessarily thin cell walls in the honeycomb structural body.

As previously described, because of suppressing the generation of shape deformation and defects such as cell-wall deformation and unnecessarily thin cell wall, the present invention provides the honeycomb structural body having an excellent strength (for example, an isostatic strength) sufficient to prevent external stress such as stress generated when the honeycomb structural body is assembled to an exhaust gas pipe of an internal combustion engine.

As previously described, in the structure of the honeycomb structural body according to the present invention, the opening section of each of the first specific imperfectly shaped cells is plugged or closed with the same raw material, with which the cell walls are formed. The opening section of each of the first specific imperfectly shaped cells has the opening area which is smaller than an opening area of the second specific imperfectly shaped cells in the second imperfectly shaped cell group in the imperfectly shaped cells in the honeycomb structural body. This makes it possible to prevent the imperfectly shaped cells from being clogged with the catalyst in the catalyst slurry supplied during the catalyst application process performed after the cell formation process in the manufacture of the honeycomb structural body. In addition, this makes it possible to prevent the decreasing of a gas flowing capability, the increase of a pressure loss, and the increasing of wastage of catalyst such as noble metal.

On the other hand, it is possible to avoid the necessity of supporting catalyst such as expensive noble metal on the first specific imperfectly shaped cells. This makes it possible to decrease the manufacturing cost of the honeycomb structural body.

Still further, the first specific imperfectly shaped cells, the opening section of each of which has a small area, are plugged or closed only. This structure makes it possible to decrease a pressure loss without decreasing the overall flowing rate of exhaust gas in the honeycomb structural body. Furthermore, this structure makes it possible to adequately have a specific surface area of the cell walls necessary to perform the catalyst reaction with exhaust gas, and have no possibility of decreasing the exhaust gas purification capability.

In addition, the first specific imperfectly shaped cells, the opening section of each of which has a small area, are plugged or closed only. This structure makes it possible to suppress the entire weight of the honeycomb structural body from increasing (that is, to prevent the increasing of a thermal capacity of the honeycomb structural body). Further, it is possible to increase the overall strength of the honeycomb structural body without decreasing a temperature rising speed necessary to speedily increase the catalyst supported on the cell walls.

The present invention provides the honeycomb structural body having an excellent strength and decreased number of cells having shape deformation and defects.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

Embodiments

In a honeycomb structural body 1, cells 3 formed in a central section 11 and cells 3 formed in an outer peripheral section 12 contain imperfectly shaped cells 32. The imperfectly shaped cells are in contact directly with a boundary partition wall 13. The boundary partition wall 14 divides the honeycomb structural body 1 into two sections, i.e. the central section 11 and the outer peripheral section 12. The imperfectly shaped cells 32 are different in shape from normal cells 31. The normal cell 31, i.e. the perfectly shaped cell 31 has a predetermined shape and a predetermined length, for example, a square-like shape, a hexagonal-like shape, etc. surrounded by the partition walls only. That is, each of the imperfectly shaped cells is surrounded by the boundary partition wall 13 in addition to the cell walls 2. As previously described, the imperfectly shaped cell 32 is different in shape from the normal cell 31 (or the perfectly shaped cell).

In the honeycomb structural body 1 according to the present invention, the imperfectly shaped cells 32 are divided into a first imperfectly shaped cell group and a second imperfectly shaped cell group. The imperfectly shaped cells in the first imperfectly shaped cell group are smaller in opening area of an opening section than the imperfectly shaped cells in the second imperfectly shaped cell group. Each of the first specific imperfectly shaped cells 321 has an opening section having an opening area of not less than the predetermined area S. The predetermined area S is expressed by the equation of $S=(P-T)^2/8$. In the equation, reference character P indicates a cell pitch of the cells 3 arranged in the central section 11 and the outer peripheral section 12. The central section 11 and the outer peripheral section 12 contain the imperfectly shaped cells 32. Reference character T indicates a thickness of the cell walls 2.

In a case in which the imperfectly shaped cells, the opening section of which is more than the predetermined area S (=$(P-T)^2/8$), are plugged or closed with the raw material of the cell walls 2, a difference in a raw material feeding speed and a feeding amount of the raw material is generated between the imperfectly shaped cells and the normal cells when the raw material is fed through the extrusion metal die. The difference further causes the shape deformation and defects such as cell-wall deformation and unnecessarily thin cell wall in the cell walls which are in contact directly with the imperfectly shaped cells plugged or closed by the raw material. There is a possibility of decreasing the overall strength of the produced honeycomb structural body. Still further, this increases the overall weight of the produced honeycomb structural body. Further, there is a possibility of it being difficult to rapidly increase a temperature of the catalyst supported on the surfaces of the cell walls in the honeycomb structural body. In other words, there is a possibility for the produced honeycomb structural body to have a high specific heat capacity or poor heat resistance because it is necessary to rise a temperature thereof.

It is preferable that the second imperfectly shaped cell group in the imperfectly shaped cells 32 formed in the central section 11 and the outer peripheral section 12 is comprised of second specific imperfectly shaped cells 322. Each of the second specific imperfectly shaped cells 322 has a quadrilateral shape having four sides, and an opening section having a second opening area of not more than the predetermined area S. It is preferable that the second specific imperfectly shaped cells 322 are plugged or closed by the same raw material, with which the cell walls 2 are formed. In particular, the opening area of the opening section of the second specific imperfectly shaped cell 322 is larger than the opening area of the opening section of the first specific imperfectly shaped cell 321. That is, the imperfectly shaped cell having a different shape has a different degree of shape deformation. An imperfectly shaped cell having a quadrilateral shape formed by four sides is unstable in shape and more easily deformed rather than an imperfectly shaped cell having a triangle-like shape. Accordingly, it is possible to further prevent the generation of shape deformation and defects such as cell-wall deformation and unnecessarily thin cell walls in the honeycomb structural body when the imperfectly shaped cells (having a quadrilateral shape formed by four sides and satisfying the conditions previously described) are plugged or closed even if these imperfectly shaped cells have a large opening area. This makes it possible to further prevent the generation of the shape deformation and defects such as cell-wall deformation and unnecessarily thin cell walls in the honeycomb structural body.

First Exemplary Embodiment

A description will be given of the honeycomb structural body 1 according to the first exemplary embodiment with reference to FIG. 1 to FIG. 4.

Figure 1:
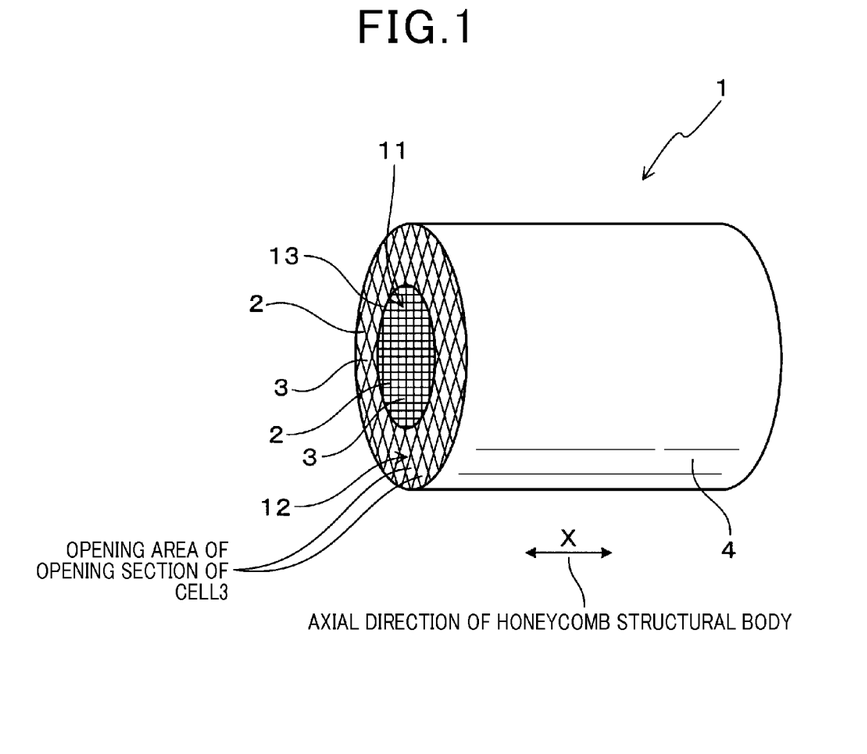
FIG. 1 is a perspective view showing an overall honeycomb structural body according to a first exemplary embodiment of the present invention.

FIG. 1 is a perspective view showing the honeycomb structural body 1 according to the first exemplary embodiment.

As shown in FIG. 1, the honeycomb structural body 1 according to the first exemplary embodiment has the cell walls 2 arranged in a lattice-like shape and a plurality of the cells 3. Each of the cells 3 is surrounded by the cell walls 2. In a cross section in a direction which is perpendicular to an axial direction X of the honeycomb structural body 1, the central section 11 and the outer peripheral section 12 are formed. The central section 11 contains a central axis of the honeycomb structural body 1. The outer peripheral section 12 is lower in a cell density than the central section 11. The outer peripheral section 12 surrounds the central section 11 through the boundary partition wall 13. That is, the boundary partition wall 13 divides the cross section of the honeycomb structural body 1 into the central section 11 and the outer peripheral section 12.

As shown in FIG. 1, the cells 3 in the central section 11 and the cells 3 in the outer peripheral section 12 contain the imperfectly shaped cells 32. The imperfectly shaped cells 32 are in contact directly with the boundary partition wall 13. The imperfectly shaped cells 32 formed in the central section 11 and the outer peripheral section 12 are facing to each other through the boundary partition wall 13.

In the structure of the honeycomb structural body 1 according to the first exemplary embodiment, the imperfectly shaped cells 32 formed in the central section 11 and the outer peripheral section 12 are divided into a first imperfectly shaped cell group and a second imperfectly shaped cell group. The imperfectly shaped cell in the first imperfectly shaped cell group is smaller in an opening area of an opening section than the imperfectly shaped cell in the second imperfectly shaped cell group. The first imperfectly shaped cell group is comprised of first specific imperfectly shaped cells 321. An opening area of the opening section of each of the first specific imperfectly shaped cells 321 is not more than a predetermined area S. In particular, the first specific imperfectly shaped cells 321 are plugged or closed by the same raw material forming the cell walls 2. The predetermined area S is expressed by the equation of $S=(P-T)^2/8$. In the equation, reference character P indicates a cell pitch of the cells 3 arranged in the central section 11 and the outer peripheral section 12, and reference character T indicates a thickness of the cell walls 2.

A description will now be given of a structure of the first specific imperfectly shaped cell 321.

As shown in FIG. 1, the honeycomb structural body 1 is made of cordierite and used for purifying exhaust gas emitted from an internal combustion engine.

The honeycomb structural body 1 according to the first exemplary embodiment is comprised of the cells 3, the cell walls 2 which form each of the cells 3, and an outer peripheral wall section 4. The cell walls 2 are arranged in a quadrilateral lattice-like shape. Each of the cells 3 is surrounded by the cell walls 2 in order to form the cell 3. The cells 3, the cell walls 2 and the outer peripheral wall (or an outer peripheral skin wall) 4 are integrated together.

Figure 2:
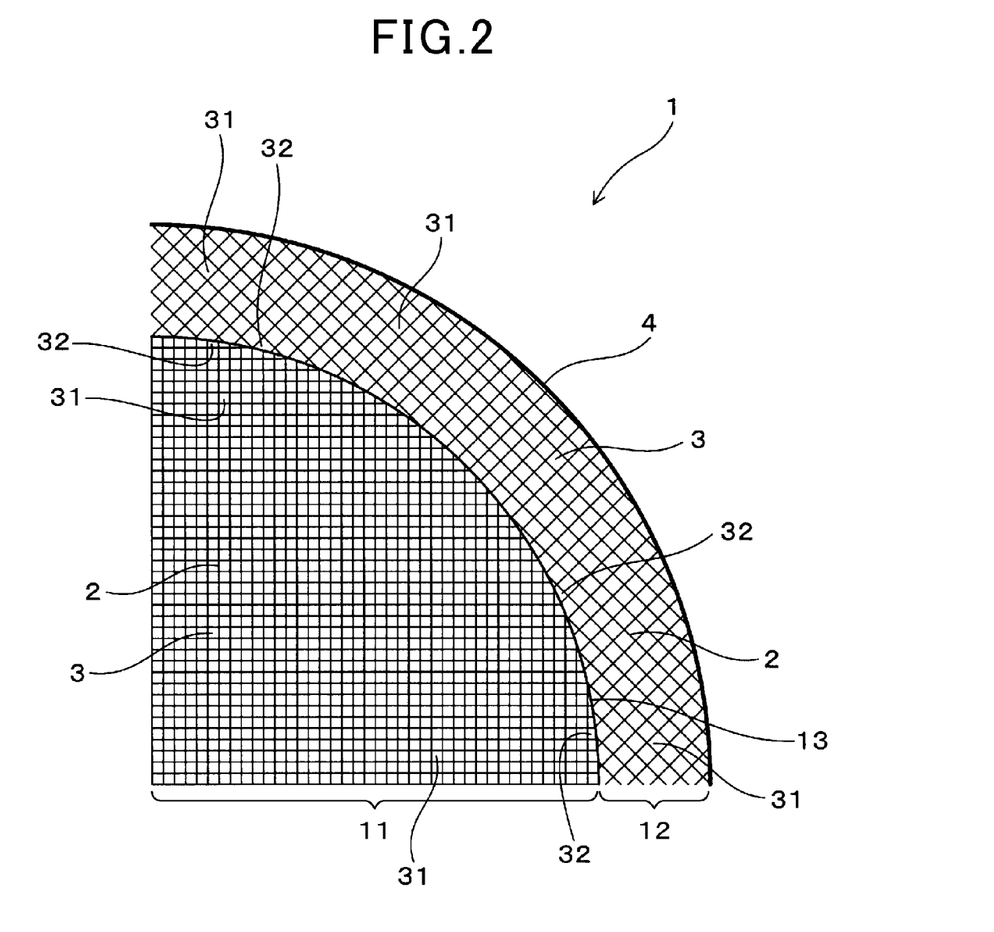
FIG. 2 is a view showing a cross section of the honeycomb structural body in a direction which is perpendicular to an axial direction X of the honeycomb structural body according to the first exemplary embodiment of the present invention.

FIG. 2 is a view showing a cross section of the honeycomb structural body 1 along a direction which is perpendicular to an axial direction X of the honeycomb structural body 1 according to the first exemplary embodiment.

As shown in the partial cross section in FIG. 2, the honeycomb structural body 1 is divided into the central section 11, the outer peripheral section 12 and the boundary partition wall 13. The central section 11 contains the central axis of the honeycomb structural body 1. The central section 11 is separated from the outer peripheral section 12 by the boundary partition wall 13. The boundary partition wall 13 has a thickness of 0.2 mm in the structure of the honeycomb structural body 1 according to the first exemplary embodiment. By the way, FIG. 2 shows a quarter section of the cross section of the honeycomb structural body 1 according to the first exemplary embodiment.

As shown in FIG. 2, the cells 3 in the central section 11 and the cell direction have a different cell-direction to each other. In the structure of the honeycomb structural body 1 according to the first exemplary embodiment, the cells 3 in the central section 11 are oriented relative to the cells 3 in the outer peripheral section 12 by 45 degrees.

The overall central section 11 has the same cell density. Similar to the central section 11, the outer peripheral section 12 has the same cell density. The cell density in the central section 11 is higher than the cell density of the outer peripheral section 12. In the first exemplary embodiment, the central section 11 has a cell density of 600 cells per inch$^2$ and the outer peripheral section 12 has a cell density of 400 cells per inch$^2$.

Figure 4:
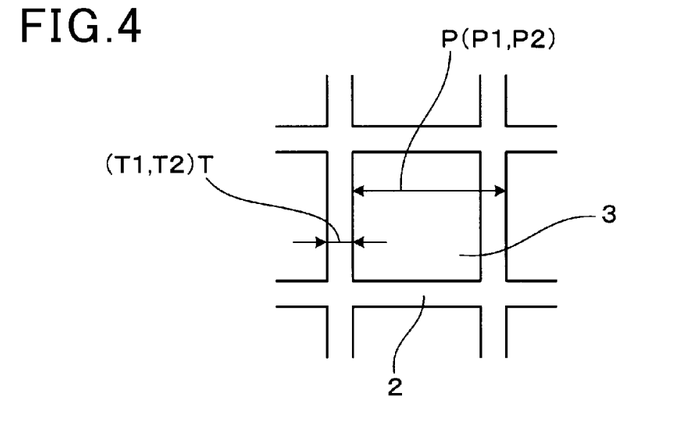
FIG. 4 is a view explaining a cell pitch P (P1, P2) and a thickness T (T1, T2) of the cell wall in the honeycomb structural body according to the first exemplary embodiment of the present invention.

FIG. 4 shows the cell pitch P (P1, P2) of the cells 3 and the thickness T (T1, T2) of the cell wall 2 in the honeycomb structural body 1 according to the first exemplary embodiment. The cells 3 in the central section 11 have the cell pitch P1 (=P) of 1.04 mm (P1=1.04 mm). The cell wall 2 in the central section 11 has the thickness T1 (=T) of 0.075 mm (T1=0.075 mm). On the other hand, the cells 3 in the outer peripheral section 12 have the cell pitch P2 (=P) of 1.27 mm (P2=1.27). The cell wall 2 in the outer peripheral section 12 has the thickness T2 (=T) of 0.09 mm (T2=0.09 mm).

Figure 3:
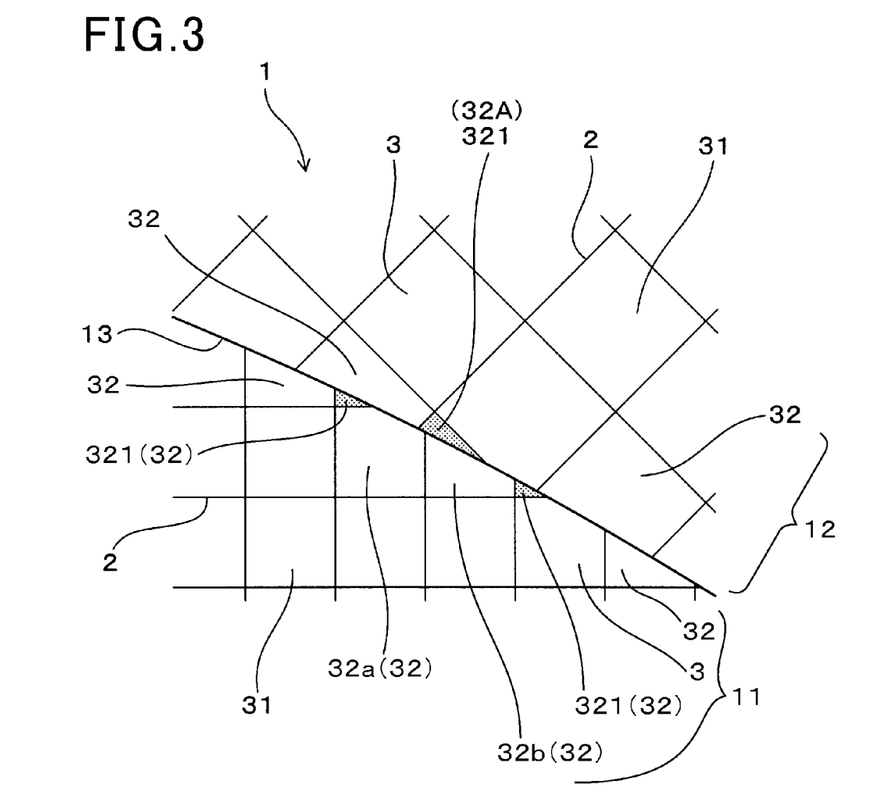
FIG. 3 is an enlarged view of a cross section of a part of the boundary partition wall, the normal cells and the imperfectly shaped cells having the first specific imperfectly shaped cells adjacent to the boundary partition wall in the honeycomb structural body according to the first exemplary embodiment of the present invention.

FIG. 3 is an enlarged view of a cross section of a part of the boundary partition wall 13, the normal cells 3 (or the perfectly shaped cells 3) and the imperfectly shaped cells 32 having the first specific imperfectly shaped cells 321 adjacent to the boundary partition wall 13 in the honeycomb structural body 1 according to the first exemplary embodiment.

As shown in FIG. 2 and FIG. 3, the cells 3 in the central section 11 and the outer peripheral section 12 have the normal cells 31 (or the perfectly shaped cells 31) and the imperfectly shaped cells 32. The normal cells 31 are not in contact directly with the boundary partition wall 13. The imperfectly shaped cells 32 are in contact directly with the boundary partition wall 13.

The normal cells 31 are the cells 3 having a predetermined complete shape (for example, a quadrilateral shape such as a square shape and a rectangle shape in the first exemplary embodiment). The normal cells 31, i.e. the perfectly shaped cells 31, which are surrounded by the cell walls 2 only.

On the other hand, the imperfectly shaped cells 32 are the cells having an incomplete shape, which is different from the predetermined complete shape and surrounded by the cell walls 2 and the boundary partition wall 13.

As shown in FIG. 3, the imperfectly shaped cell 32 in the central section 11 and the imperfectly shaped cell 32 in the outer peripheral section 12 are facing together through the boundary partition wall 13.

Further, the imperfectly shaped cells 32 contain the first specific imperfectly shaped cells 321 in the central section 11 and the outer peripheral section 12. Each of the imperfectly shaped cells 32 in the first imperfectly shaped cell group is smaller in an opening area of an opening section than each of the imperfectly shaped cells 32 in the second imperfectly shaped cell group. Further, the first specific imperfectly shaped cell 321 in the first imperfectly shaped group has the opening section which has an opening area of not more than the predetermined area S. In particular, the first specific imperfectly shaped cells 321 are plugged or closed with the same raw material made of cordierite, with which the cell walls 2 are formed.

The predetermined area S is expressed by an equation of $S=(P-T)^2/8$, where P (P1, P2) indicates a cell pitch of the cells 3 arranged in the central section 11 and the outer peripheral section 12 and T (T1, T2) indicates a thickness of the cell walls 2. That is, the predetermined area S is expressed by the equation of $S=(P1-T1)^2/8$ when the imperfectly shaped cells 32 are formed in the central section 11. The predetermined area S is expressed by the equation of $S=(P2-T2)^2/8$ when the imperfectly shaped cells 32 are formed in the outer peripheral section 12.

For example, as shown in FIG. 3, the outer peripheral section 12 contains the imperfectly shaped cell 32A which is in contact directly with the boundary partition wall 13. As shown in FIG. 3, the imperfectly shaped cell 32A in the outer peripheral section 12 are facing to the imperfectly shaped cells 32a and 32b in the central section 11 through the boundary partition wall 13. The imperfectly shaped cells 32a and 32b are also in contact directly with the boundary partition wall 13.

When the imperfectly shaped cells 32A formed in the outer peripheral section 12 and the imperfectly shaped cells 32a, 32b formed in the central section 11 are compared to each other regarding the opening area of the opening section thereof, the imperfectly shaped cell 32A has a small opening area. Further, the opening area of the opening section of the imperfectly shaped cell 32A is not more than the predetermined area S. The predetermined area S is expressed by the equation of $S=(P2-T2)^2/8$ which is introduced on the basis of the cell pitch P2 (=P) of the cells 3 and the thickness T2 (=T) of the cell walls 2 in the outer peripheral section 12. Accordingly, the imperfectly shaped cell 32A in the outer peripheral section 12 is plugged or closed with the raw material used for making the cell walls.

A description will now be given of a brief explanation of a method of manufacturing the honeycomb structural body 1 according to the first exemplary embodiment because it is possible to use a conventional method to manufacture the honeycomb structural body 1.

First, raw material such as cordierite is extruded by using an extrusion metal die in order to produce a honeycomb shaped body, i.e. a ceramic green body. The produced ceramic green body is cut to a plurality of parts having a predetermined length. The parts having the predetermined length are dried and fired under predetermined conditions. This makes the honeycomb structural body 1 according to the first exemplary embodiment.

It is possible to use an extrusion metal die in order to produce the ceramic green body. A plurality of slit grooves is formed in the extrusion metal die. The slit grooves correspond to the shape of the cell walls 2 of the honeycomb structural body 1. It is possible to form the slit grooves in the extrusion metal die by using an electrical discharge machining, a laser processing, a slicing, etc.

In particular, the slit grooves, which correspond to the first specific imperfectly shaped cells 321 and the second specific imperfectly shaped cells 322 in the honeycomb structural body 1, are eliminated from the extrusion metal die. This structure makes it possible to feed raw material to the parts of the ceramic green body corresponding to the first specific imperfectly shaped cells 321 and the second specific imperfectly shaped cells 322 in the honeycomb structural body 1. In other words, the first specific imperfectly shaped cells 321 and the second specific imperfectly shaped cells 322 are plugged or closed with the same raw material of the cell walls 2 in the structure of the honeycomb structural body 1 according to the first exemplary embodiment.

By the way, when the extrusion process of the raw material is performed by the conventional method using the extrusion metal die having the structure previously described, there is a possibility of generating shape deformation and defects of the cell walls 2 because a flow resistance of the raw material at the parts of the extrusion metal die, from which the slit grooves have been removed, is low, and the amount of the fed raw material is concentrated at the parts corresponding to the first specific imperfectly shaped cells 321 and the second specific imperfectly shaped cells 322 in the ceramic green body, and an insufficient amount of the raw material is fed to cell walls 2 near the parts corresponding to the first specific imperfectly shaped cells 321 and the second specific imperfectly shaped cells 322. In order to eliminate the drawback, it is necessary to feed a sufficient amount of the raw material to the overall extrusion metal die, and prevent the raw material from being not uniformly concentrated at specific parts. In other words, it is necessary to uniformly feed or supply the raw material to the whole extrusion metal die at a same feeding speed of the raw material. Specifically, it is necessary to enhance the flow resistance of the raw material at the feeding holes of the extrusion metal die from which the slit grooves have already been removed in order to obtain the same feeding speed of the raw material in the whole extrusion metal die.

Next, a description will now be given of the actions and effects of the honeycomb structural body 1 according to the first exemplary embodiment.

In the structure of the honeycomb structural body 1 according to the first exemplary embodiment, the cells 3 in the central section 11 and the outer peripheral section 12 contain the imperfectly shaped cells 32 which are in contact directly with the boundary partition wall 13. In other words, the imperfectly shaped cells 32 formed in the central section 11 and the outer peripheral section 12 are facing to each other through the boundary partition wall 13.

These imperfectly shaped cells 32 are divided into the first imperfectly shaped cell group and the second imperfectly shaped cell group. Each of the imperfectly shaped cells 32 in the first imperfectly shaped cell group is smaller in an opening area of an opening section than each of the imperfectly shaped cells 32 in the second imperfectly shaped cell group.

Further, the first imperfectly shaped cell group has the first specific imperfectly shaped cells 321. The opening area of the opening section of each of the first specific imperfectly shaped cells 321 is not more than the predetermined area S. In particular, the first specific imperfectly shaped cells 321 are plugged or closed by the same raw material forming the cell walls 2.

In the imperfectly shaped cells 32 in contact directly with the boundary partition wall 13, the opening section of each of the first specific imperfectly shaped cells 321 is plugged or closed because the opening section of each of the first specific imperfectly shaped cells 321 is easily clogged by the catalyst in the catalyst application process, has a small opening area after the catalyst application process, and has a high flow resistance to the exhaust gas flow when the honeycomb structural body 1 is mounted to the exhaust gas pipe of an internal combustion engine. This structure of the honeycomb structural body 1 makes it possible to suppress the generation of a difference in a feeding speed and a feeding amount of the raw material through the extrusion metal die between the first specific imperfectly shaped cells 321 and the normal cells 2 (or the perfectly shaped cells 2).

It is necessary to feed a sufficient amount of the raw material in order to plug or close the opening section of each of the imperfectly shaped cells 32. The more the feeding amount of the raw material is increased, the more the amount of the raw material to be fed to the cell walls 2, which are in contact directly with the imperfectly shaped cells 32. This easily causes shape deformation and defects such as cell-wall deformation and unnecessarily thin cell wall increase. In order to eliminate any occurrence of this drawback, the subject matter of the present invention determines the size of the imperfectly shaped cell 32 to be plugged or closed with the raw material. This makes it possible to prevent the generation of shape deformation shape deformation and defects of the cell walls 2.

Still further, as previously described, it is possible for the honeycomb structural body 1 to have a sufficient strength against external stress such as a stress applied when the honeycomb structural body 1 is mounted to the exhaust gas pipe of an internal combustion engine because the honeycomb structural body 1 has the structure capable of preventing generation of shape deformation and defects such as cell-wall deformation and unnecessarily thin cell wall, as previously described.

Still further, as previously described, the first specific imperfectly shaped cells 321 having a small opening area in the imperfectly shaped cells 32 are plugged or closed with the raw material. It is accordingly, to prevent the opening section of each of the imperfectly shaped cells 32 from being clogged with the catalyst in the catalyst application process performed after the extrusion process. This makes it possible to prevent the decreasing of an exhaust gas passing capability, the increasing of the pressure loss and the waste of the catalyst such as noble metal.

Furthermore, it is not necessary to supply expensive catalyst to the first specific imperfectly shaped cells 321 in the catalyst application process because the first specific imperfectly shaped cells 321 are plugged, i.e. closed. This makes it possible to decrease the manufacturing cost of the honeycomb structural body 1.

Further, only the first specific imperfectly shaped cells 321 having a small opening area and low exhaust gas passing capability, when compared with the other cells such as the normal cells 3 are plugged with the same raw material of the cell walls 2. This structure prevents the decreasing of the pressure loss and maintains the sufficient specific surface area of the cell walls necessary to perform the catalyst reaction.

Still further, only the first specific imperfectly shaped cells 321 having a small opening area (a small volume) are plugged with the same raw material of the cell walls 2. This structure makes it possible to suppress the increasing of the whole weight of the honeycomb structural body 1 and increase the whole strength of the honeycomb structural body 1 without decreasing the temperature rising capability necessary to rapidly increase the temperature of the catalyst supported on the cell walls of the honeycomb structural body 1.

As previously described, it is possible for the present invention to provide the honeycomb structural body 1 having an increased strength while suppressing the generation of shape deformation and defects of the cell walls.

In the structure of the honeycomb structural body 1 according to the first exemplary embodiment previously described in detail, the imperfectly shaped cells 32 formed in the central section 11 and the outer peripheral section 12 are divided into the first imperfectly shaped cell group and the second imperfectly shaped cell group.

As shown in FIG. 3, the imperfectly shaped cells 32 in the central section 11 are facing the imperfectly shaped cells 32 through the boundary partition wall 13. That is, each of the imperfectly shaped cells 32 in the first imperfectly shaped cell group is smaller in an opening area of an opening section than each of the imperfectly shaped cells 32 in the second imperfectly shaped cell group. In particular, the first imperfectly shaped cell group has the first specific imperfectly shaped cells 321. As shown in FIG. 3, the opening area of the opening section of each of the first specific imperfectly shaped cells 321 is not more than the predetermined area S, and the first specific imperfectly shaped cells 321 are plugged by the same raw material forming the cell walls 2.

Figure 5:
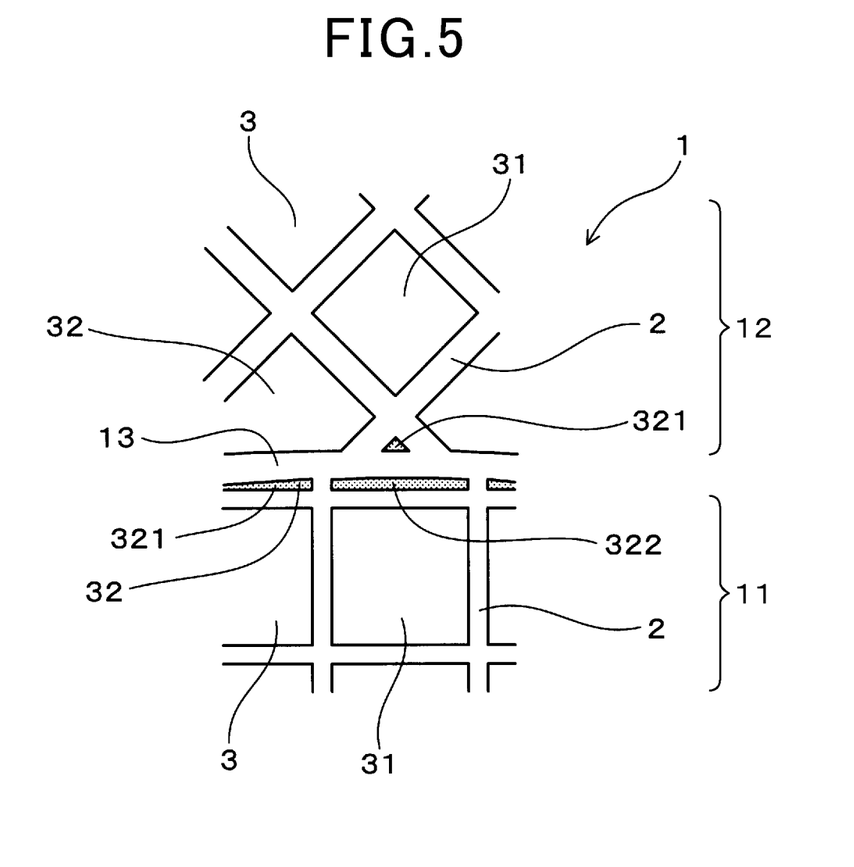
FIG. 5 is an enlarged view of a cross section of a part near the boundary partition wall in the honeycomb structural body according to the first exemplary embodiment of the present invention.

FIG. 5 is an enlarged view of a cross section of a part near the boundary partition wall 13 in the honeycomb structural body 1 according to the first exemplary embodiment.

As shown in FIG. 5, the second imperfectly shaped cell group in the imperfectly shaped cells 32 in the central section 11 contains the second specific imperfectly shaped cells 322. Each of the second specific imperfectly shaped cells 322 has a quadrilateral shape having four sides and an opening section having the second opening area of not more than the predetermined area S. The second opening area is larger than the first opening area of the opening section of each of the first specific imperfectly shaped cell 321. Accordingly, it is acceptable that the second specific imperfectly shaped cells 322 are plugged by the same raw material forming the cell walls 2.

In the explanation previously described, an opening area of the opening section of each of the imperfectly shaped cells 32 in the first imperfectly shaped cell group is less than a half of the opening area of the opening section of the perfectly shaped cell 31. Further, an opening area of the opening section of each of the imperfectly shaped cells 32 in the second imperfectly shaped cell group is not less than the half of the opening area of the opening section of the perfectly shaped cell 31.

That is, the imperfectly shaped cells 32 have a different deformation condition on the basis of the shape thereof. In general, the imperfectly shaped cell 32 having a triangle-like shape is stable in deformation than the imperfectly shaped cell 32 having a quadrilateral shape such as a square shape and a rectangle shape. So, it is difficult to deform the imperfectly shaped cell 32 having a triangle-like shape when compared with the imperfectly shaped cell 32 having a quadrilateral shape.

Accordingly, in the imperfectly shaped cells 32 formed in the central section 11 and the imperfectly shaped cells 32 in the outer peripheral section 12, which are facing together through the boundary partition wall 13, the imperfectly shaped cells 32 (i.e. the second specific imperfectly shaped cells 322) are plugged or closed with the same raw material, with which the cell walls 2 are formed, when satisfying the above condition (i.e. having a quadrilateral shape) even if the second specific imperfectly shaped cells 322 have a relatively large opening area. This structure makes it possible to further prevent the shape deformation of the cell walls 2 such as cell-wall deformation and unnecessarily thin cell wall and defects of the cells 3.

Second Exemplary Embodiment

A description will be given of the second exemplary embodiment with reference to FIG. 6.

The second exemplary embodiment detected the relationship in an opening area of an opening section of the imperfectly shaped cells 32 and the clogged cells generated in the cells 2 of the honeycomb structural body 1.

The second exemplary embodiment produced a honeycomb structural body containing imperfectly shaped cells in which an opening section of each of the imperfectly shaped cells has a different opening area. Further, the opening section of each of the imperfectly shaped cells was not plugged, i.e. is open. Further, the second exemplary embodiment detected the generation of cells clogged by the catalyst by using a catalyst slurry having a low viscosity and a catalyst slurry having a high viscosity. The catalyst slurry and the catalyst slurry contained catalyst such as noble metal.

The produced honeycomb structural body basically had the same structure of the honeycomb structural body 1 according to the first exemplary embodiment.

Specifically, when the catalyst slurry having a low viscosity was used, the catalyst slurry having a low viscosity was supplied into the inside of the honeycomb structural body, and an excess amount of the catalyst slurry which exceeds a predetermined applying amount necessary for the catalyst application process was adsorbed. It is possible to blow the excess amount of the catalyst slurry from the honeycomb structural body by air blow, On the other hand, when the catalyst slurry having a high viscosity was used, the predetermined applying amount of the catalyst slurry having a high viscosity necessary for the catalyst application process was supplied into the inside of the honeycomb structural body by absorbing the catalyst slurry.

After this process, the second exemplary embodiment detected a ratio of generating the catalyst clogged cells in a ratio of the imperfectly shaped cells to the normal cells (i.e. the perfectly shaped cells) in the honeycomb structural body.

In the second exemplary embodiment, the ratio of the imperfectly shaped cells to the normal cells (or the perfectly shaped cells) is a ratio of an opening area of the opening section of the imperfectly shaped cells when the opening area of the opening section of the normal cells is one.

Figure 6:
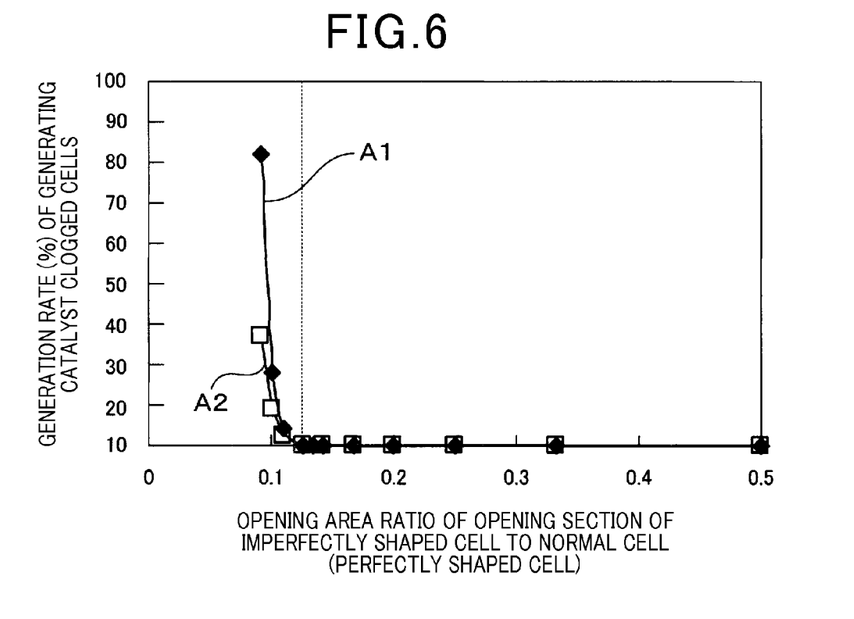
FIG. 6 is a view showing a graph of a relationship between an opening area ratio of an opening section of the imperfectly shaped cells to the normal cells and a rate of generating catalyst clogged cells in the honeycomb structural body according to the second exemplary embodiment of the present invention.

FIG. 6 shows a graph which explains a relationship between an opening area ratio of an opening section of the imperfectly shaped cells 32 to the normal cells 2 and a rate of generating catalyst clogged cells in the honeycomb structural body. In FIG. 6, reference character A1 indicates an experimental result when the catalyst slurry having a low viscosity was used, and reference character A2 indicates an experimental result when the catalyst slurry having a high viscosity was used.

It can be understood from the results shown in FIG. 6 that the rate of generating the catalyst clogged cells drastically increases when the opening area ratio of the imperfectly shaped cell to the normal cell (or the complete shaped cell) becomes not more than 0.125 (=⅛).

On the other hand, it is also understood that the rate of generating the catalyst clogged cells drastically becomes substantially, i.e. approximately zero percentage (=0%) when the opening area ratio of the imperfectly shaped cell to the normal cell (or the complete shaped cell) exceeds 0.125 (=⅛).

As a result, it can be understood that it is preferable to plug or close the opening section of each of the imperfectly shaped cells having an opening area of not more than the predetermined area S in order to prevent the generation of catalyst clogged cells.

As previously described, the predetermined area S is expressed by an equation of $S=(P-T)^2/8$, where P indicates a cell pitch of the cells 3 arranged in the central section 11 and the outer peripheral section 12 in the honeycomb structural body 1, and T indicates a thickness of the cell walls 2 in the honeycomb structural body 1.

Third Exemplary Embodiment

A description will be given of the third exemplary embodiment with reference to FIG. 7A, FIG. 7B and FIG. 7C.

The third exemplary embodiment produced a plurality of the honeycomb structural bodies. Each of the honeycomb structural bodies has a plurality of imperfectly shaped cells and the opening section of each of the imperfectly shaped cells has a different opening area ratio to the opening area of the normal cell (or the perfectly shaped cell). The third exemplary embodiment performed the experimental test in order to detect the generation of shape deformation and defects of the cell walls (or cells). The third exemplary embodiment uses the honeycomb structural body having the basic structure which was equal to that of the honeycomb structural body 1. Further, the third exemplary embodiment used an extrusion metal die, from which the slit grooves shown in FIG. 8 which correspond to the imperfectly shaped cells were removed, in order to plug the opening area of the imperfectly shaped cells by the same raw material, with which the cell walls were formed.

In the experimental test regarding the shape deformation and defects of cell walls (or cells), a tool makers microscope (or a measuring microscope) detected and measured an enlarged view of a normal cell (or a perfectly shaped cell) and an imperfectly shaped cell adjacent to the boundary partition wall 13.

Table 1 shows the detection results of the experimental test. In Table 1, the reference character "○" indicates that a hydraulic diameter of a cell has a difference within a range of not more than 10% of a predetermined design value when the hydraulic diameter of the cell was compared with the predetermined design value, the reference character "Δ" indicates that a hydraulic diameter of a cell has a difference within a range of more than 10% and not more than 20% of the predetermined design value when the hydraulic diameter of the cell was compared with the predetermined design value, and the reference character "X" indicates that a hydraulic diameter of a cell has a difference within a range of more than 20% of the predetermined design value when the hydraulic diameter of the cell was compared with the predetermined design value.

Figure 7A:
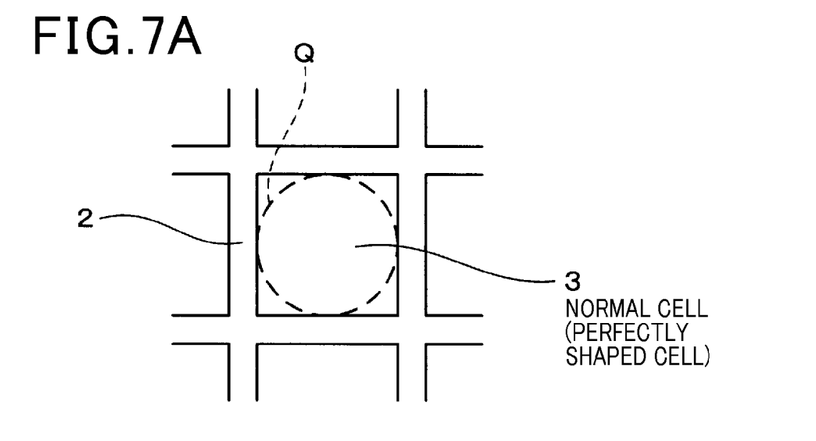
FIG. 7A is a view showing a hydraulic diameter of a normal cell (i.e. a perfectly shaped cell) when no shape deformation occurs.
Figure 7B:
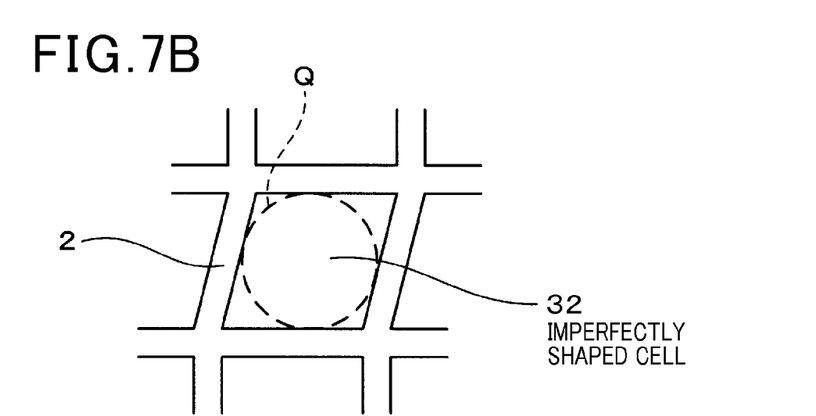
FIG. 7B is a view showing a hydraulic diameter of an imperfectly shaped cell when a shape deformation occurs in cell walls forming the imperfectly shaped cell.
Figure 7C:
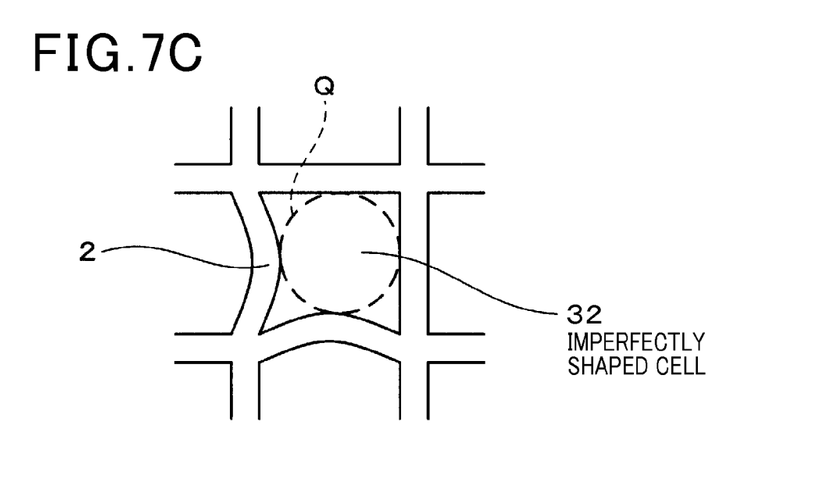
FIG. 7C is a view showing a hydraulic diameter of another imperfectly shaped cell when a shape deformation occurs in cell walls forming the imperfectly shaped cell.

FIG. 7A is a view showing a hydraulic diameter of a normal cell 3 (i.e. a perfectly shaped cell) when no shape deformation occurs. FIG. 7B is a view showing a hydraulic diameter of an imperfectly shaped cell 32 when a shape deformation occurs in cell walls forming the imperfectly shaped cell 32. FIG. 7C is a view showing a hydraulic diameter of another imperfectly shaped cell 32 when a shape deformation occurs in cell walls forming the imperfectly shaped cell 32.

The hydraulic diameter of a cell indicates a diameter of an inscribed circle which is inscribed inside the cell walls which form the cell. For example, in the case shown in FIG. 7A in which no shape deformation occurs, a diameter of an inscribed circle Q of the normal cell 3 is referred as a hydraulic diameter of the normal cell 3. The diameter of the inscribed circle Q is used as the predetermined design value. On the other hand, each of FIG. 7B and FIG. 7C shows a case of generating shape deformation. A diameter of the inscribed circle Q becomes a hydraulic diameter of the imperfectly shaped cell 32.

Table 1 shows the experimental results of the third exemplary embodiment. As shown in Table 1, when the opening area of the opening section of the imperfectly shaped cell to be closed, i.e. to be plugged is not more than ⅛ of the opening area of the opening section of the normal cell (or the perfectly shaped cell) not to be plugged, the experimental result is "○". On the other hand, when the opening area of the opening section of the imperfectly shaped cell to be plugged is more than ⅛ of the opening area of the opening section of the normal cell (or the perfectly shaped cell) not to be plugged, the experimental result of shape deformation or defects indicates one of "Δ" and "X".

TABLE 1

| Rate of imperfectly shaped cell to normal cell (perfectly shaped cell) in opening area of opening section | Occurrence of shape deformation or defects |
| --- | --- |
| 1/10 | ○ |
| 1/9 | ○ |
| 1/8 | ○ |
| 1/7 | Δ |
| 1/6 | Δ |
| 1/5 | Δ |
| 1/4 | X |
| 1/3 | X |
| 1/2 | X |

According to the experimental results shown in Table 1, it can be understood that it is preferable to plug, with the same raw material of the cell walls, the opening section of the imperfectly shaped cell having an opening area of not more than the predetermined area S. This predetermined area S is expressed by an equation of $S=(P-T)^2/8$. In the equation, P indicates a cell pitch of the cells which contain imperfectly shaped cells arranged in the central section 11 and the outer peripheral section 12, and T indicates a thickness of the cell walls 2.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A honeycomb structural body comprising:
cell walls arranged in a lattice-like shape; and
a plurality of cells formed by the cell walls so that each of the cells is surrounded by the cell walls, wherein
a cross-sectional area of the honeycomb structural body in a direction which is perpendicular to an axial direction of the honeycomb structural body is divided into a central section and an outer peripheral section by a boundary partition wall,
the central section includes a central axis of the honeycomb structural body and is arranged in an inside of the boundary partition wall, the outer peripheral section is arranged at an outside of the central section through the boundary partition wall so that the outer peripheral section surrounds the central section, the outer peripheral section has a cell density which is lower than a cell density of the central section, the cells in the central section and the outer peripheral section contain imperfectly shaped cells which are in contact directly with the boundary partition wall, the imperfectly shaped cells formed in the central section and the outer peripheral section are facing to each other through the boundary partition wall, the imperfectly shaped cells formed in the central section and the outer peripheral section are divided into a first imperfectly shaped cell group and a second imperfectly shaped cell group, each of the imperfectly shaped cells in the first imperfectly shaped cell group is smaller in an opening area of an opening section than each of the imperfectly shaped cells in the second imperfectly shaped cell group, the first imperfectly shaped cell group comprising first specific imperfectly shaped cells, an opening area of the opening section of each of the first specific imperfectly shaped cells is not more than a predetermined area S, the opening section of each of the first specific imperfectly shaped cells is plugged by a same raw material with which the cell walls are formed, and the predetermined area S is expressed by an equation of:

$$S=(P-T)^2/8,$$

where P indicates a cell pitch of the cells arranged in the central section and the outer peripheral section and T indicates a thickness of the cell walls.

2. The honeycomb structural body according to claim 1, wherein the opening area of the opening section of each of the imperfectly shaped cells in the first imperfectly shaped cell group is less than a half of an opening area of an opening section of a perfectly shaped cell in the central section and the outer peripheral section.

3. The honeycomb structural body according to claim 1, wherein the honeycomb structural body is made of cordierite and comprises the cell walls, the cells having a quadrilateral shape having four sides and surrounded by the cell walls, and an outer peripheral wall having a cylindrical shape surrounding an outer peripheral surface of the cell walls of the honeycomb structural body, and the cells, the cell walls and the outer peripheral wall are assembled together, the boundary partition wall has a thickness of 0.2 mm, the central section has a cell density of 600/inch$^2$, the outer peripheral section has a cell density of 400/inch$^2$, the cells in the central section has a cell pitch of 1.04 mm and the cell walls in the central section has a thickness of 0.075 mm, and the cells in the outer peripheral section have a cell pitch of 1.27 mm and the cell walls in the outer peripheral section have a thickness of 0.09 mm.

4. The honeycomb structural body according to claim 1, wherein the second imperfectly shaped cell group in the imperfectly shaped cells formed in the central section and the outer peripheral section comprises second specific imperfectly shaped cells, each of the second specific imperfectly shaped cells has a quadrilateral shape having four sides, and an opening section having a second opening area of not more than the predetermined area (S), the second opening area is larger than the first opening area of the opening section of each of the first specific imperfectly shaped cell, and the second specific imperfectly shaped cells are plugged by the same raw material forming the cell walls.

5. The honeycomb structural body according to claim 4, wherein the opening area of the opening section of each of the imperfectly shaped cells in the second imperfectly shaped cell group is not less than a half of an opening area of an opening section of a perfectly shaped cell in the central section and the outer peripheral section.

6. The honeycomb structural body according to claim 4, wherein the honeycomb structural body is made of cordierite and comprises the cell walls, the cells having a quadrilateral shape having four sides and surrounded by the cell walls, and an outer peripheral wall having a cylindrical shape surrounding an outer peripheral surface of the cell walls of the honeycomb structural body, and the cells, the cell walls and the outer peripheral wall are assembled together, the boundary partition wall has a thickness of 0.2 mm, the central section has a cell density of 600/inch$^2$, the outer peripheral section has a cell density of 400/inch$^2$, the cells in the central section has a cell pitch of 1.04 mm and the cell walls in the central section has a thickness of 0.075 mm, and the cells in the outer peripheral section have a cell pitch of 1.27 mm and the cell walls in the outer peripheral section have a thickness of 0.09 mm.

* * * * *